Figure 1:

May 15, 1962

F. PUHR 3,034,938

COMPOSITE STRUCTURE OF CORNCOBS FOR USE AS
INSULATING BOARDS AND METHOD
OF MAKING SAME

Filed July 11, 1958

3 Sheets-Sheet 1

INVENTOR.
Franz Puhr
BY

May 15, 1962　　　F. PUHR　　　3,034,938
COMPOSITE STRUCTURE OF CORNCOBS FOR USE AS
INSULATING BOARDS AND METHOD
OF MAKING SAME

Filed July 11, 1958　　　　　　　　　3 Sheets-Sheet 2

INVENTOR.
Franz Puhr
BY

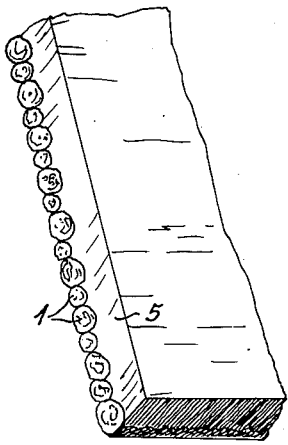
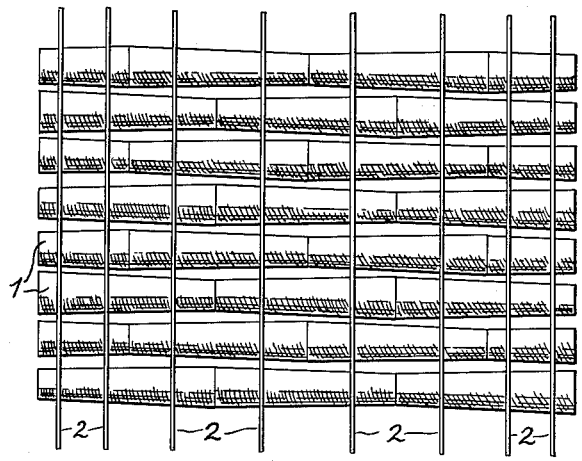
Fig. 12      Fig. 15
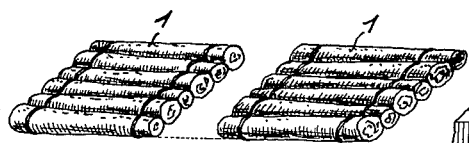 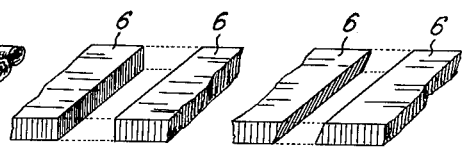
Fig. 13      Fig. 14      Fig. 16
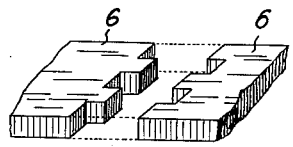 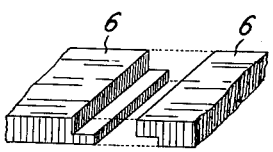 
Fig. 17      Fig. 19      Fig. 20
INVENTOR.
Franz Puhr
BY

United States Patent Office 3,034,938
Patented May 15, 1962

3,034,938
COMPOSITE STRUCTURE OF CORNCOBS FOR USE AS INSULATING BOARDS AND METHOD OF MAKING SAME
Franz Puhr, 103 Munzgrabenstrasse, Graz, Austria
Filed July 11, 1958, Ser. No. 747,866
10 Claims. (Cl. 154—43)

This invention relates to mats or boards which comprise at least one layer of corncobs or the like, which are disposed approximately parallel to the plane of the mat or board and are cut only at the ends or not cut at all. In the known mats of this type, corncobs are irregularly arranged in adjacent rows and interconnected by wires, which extend transversely through the cobs so that the same are strung on the wires. This known mat can be manufactured only with great effort by hand and lacks sufficient strength and rigidity whereas it has numerous gaps and unevennesses. Due to the unclean appearance of the mat it cannot be used without covering or plastering. The plaster must be applied in many layers to compensate these unevennesses. Quick drying is not possible and the labor expenditure is considerable. As lath, the mat must be nailed at numerous points to avoid sagging. Nevertheless a plane surface cannot be achieved. In addition to other disadvantages it is not possible, e.g., to manufacture boards in this manner.

It is an object of the invention to provide a mat or board which utilizes the technical properties of the naturally formed corncob as completely as possible without having the disadvantages described hereinbefore. These mats or boards may be used as lath, as coverings having a special achitectural effect and, depending on their construction, as acoustic board and generally as light-weight building board, lagging and insulating board against cold, heat and sound of any kind.

This is achieved according to the invention by arranging the corncobs regularly beside and behind each other and the total of the diameters of adjacent corncobs measured in the longitudinal direction of the mat or board, i.e. in the direction at right angles to the axes of the cobs, is approximately equal across two or more rows. In a development of the invention the corncobs can be affixed with binding wire, string or the like to bracing wires or the like extending at right angles to the direction of the corncobs, or may be interconnected by pasting. It is advantageous to provide at least two bracing wires and to arrange the corncobs one beside the other in one row, or to provide several bracing wires preferably spaced by half a cob length and to arrange the corncobs head to head and foot to foot in rows extending one beside the other, adjacent rows being regularly staggered.

The invention relates also to developments of the webs and mats according to the invention, particularly to their construction as boards, and to advantageous processes of manufacture.

Figure 2:
Figure 3:
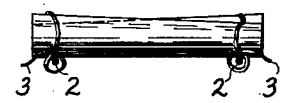
Figure 4:
Figure 5:
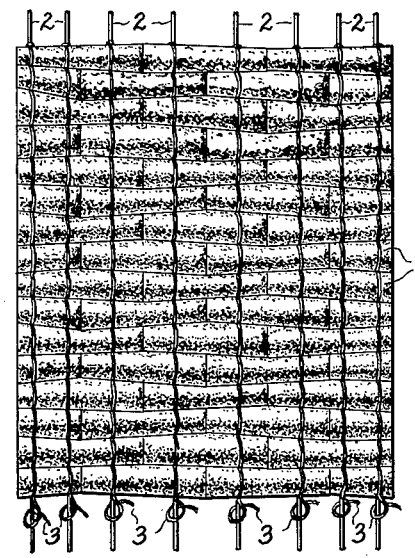
Figure 6:
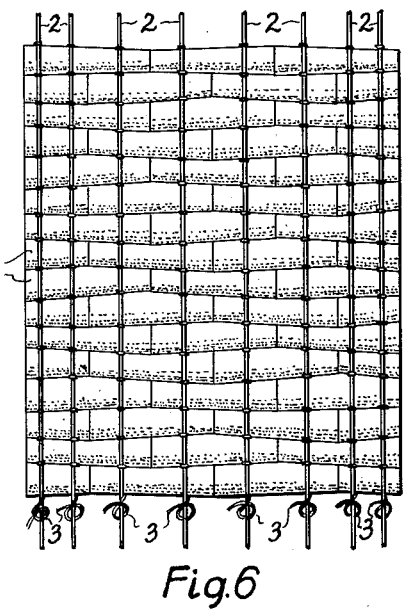
Figure 7:
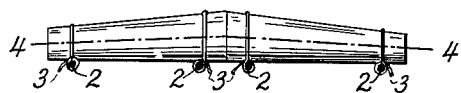
Figure 8:
Figure 18:
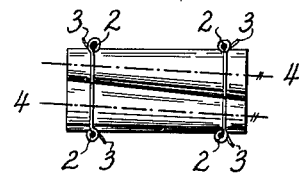
Figure 11:
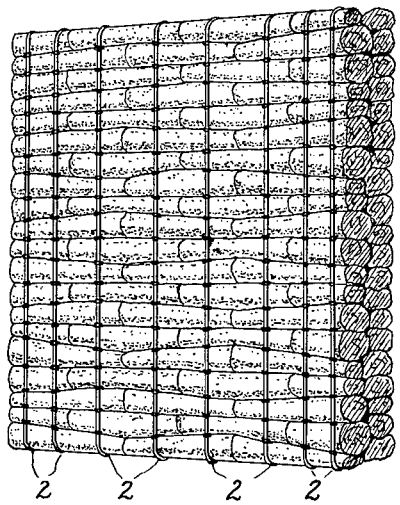
Figure 9:
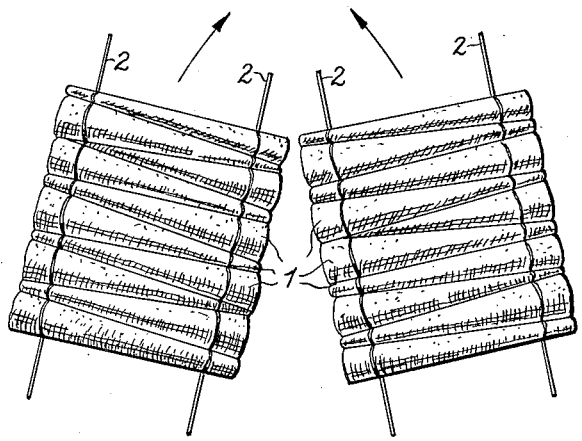
Figure 10:
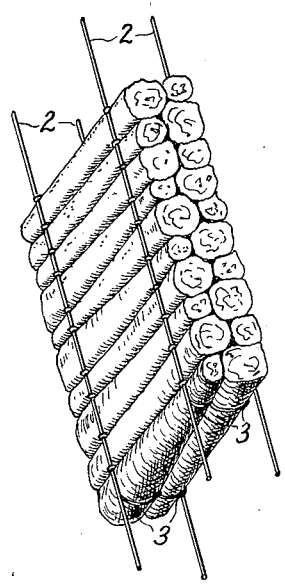

The invention will be explained more fully with reference to the drawings, which illustrate embodiments by way of example. FIG. 1 shows a corncob having its ends cut off. FIGS. 2 to 4 show a web in front elevation, cross-section and rear elevation. FIGS. 5 and 6 show mats in rear and front elevations. FIGS. 7, 8 and 18 show the joints between the cobs and the disposition of the longitudinal axes in a mat or a mat web. FIGS. 9 and 10 show webs of different construction. FIGS. 11 and 12 are perspective views of boards and FIGS. 13 and 14, 16, 17, 19 and 20 show the construction of the edges or joints of the boards according to the invention in the direction of the longitudinal axes of the cobs. FIG. 15 shows a binding pattern.

FIG. 1 shows a corncob 1, which is cut off at both ends, thereby forming a truncated body, for the purpose of the invention. The thicker part of the cob will be referred to hereinafter as the head and the slender part as the foot of the cob.

To manufacture a mat in the form of a web (mat strip), FIGS. 2, 3, 4, at least two wires 2 are stretched with a spacing which is less than the length of the cobs. The cobs 1 are placed head to foot and tied with a binding wire 3. The cobs are then compressed or pounded in the direction of the bracing wires 2 and the ends of the bracing wires are tied. The web has now been completed. The bracing wires 2 are also referred to as longitudinal wires or warp ends and may consist of any desired material.

In the manufacture of mats, FIGS. 5, 6, 15, the procedure is such that a row of bracing wires (longitudinal wires or warp ends) 2 are stretched to lie in a plane and the cobs 1 are placed in bond, FIG. 15, on the warp ends 2 in rows at right angles thereto. The cobs are arranged head to head or foot to foot, e.g., with butt joints, and the rows thus formed are staggered by half a cob length or another fraction of this length. The spacing of the bracing wires 2 is determined by this fractional amount of the staggering, the length of the cobs and the purpose for which the webs, mats and boards are intended. In FIG. 15 this spacing amounts, e.g., to half a cob length. At the edges of the mat the spacing between the three outermost wires is reduced to about ⅓ of the length of the cob. The corncobs are again tied with a thin wire 3 to the bracing wires 2 and compressed or pounded in the direction of the latter. After the warp ends 2 and binding wires 3 have been tied and the edges have been cut the mat is completed. In front elevation it presents a fairly regular surface whereas in the rear view, FIGS. 5 and 6, it gives the impression of oblique ropes.

If the mat is considered in a sectional view taken along the bracing wires 2, it will be found that the total of the diameters of the corncobs in the first and third, in the fifth and seventh rows etc. is invariable, irrespective of the point where the section is taken. The same applies to the sum of the cob diameters of the rows numbered two and four, six and eight, etc. Because the arrangement of the corncobs is repeated in groups of four rows, the sum of the cob diameters of any four adjacent rows is equal throughout the length of the rows. As the corncobs are not exactly equal in size this constantness is only approximate but this defect will disappear as the number of rows is increased. In this way mats of any desired length can be made.

A sectional view taken through a portion of the mat, FIGS. 7, 8, at right angles to the bracing wires 2 shows that the axes 4 of the corncobs are at an angle to each other because the cobs can be considered to lie with a generatrix of a cone on the wires 2 stretched in a plane. FIG. 7 shows two corncobs arranged head to head and FIG. 8 shows a foot to foot arrangement. FIG. 18 shows two corncobs arranged head to foot. Other arrangements are also possible.

The mat can be easily rolled up and bent in the direction of the bracing wires (warp ends) and can be deformed also in a direction at right angles thereto. For this reason it is particularly suitable for curved surfaces as lath and at the same time as a sound-, cold- and heat-insulating covering or lining on walls, ceilings etc. Its novel and interesting front and rear views provide novel architectural surface effects (FIG. 5, 6, 11).

The mat webs according to FIGS. 2 to 4 may be combined to form stiff board strips as is illustrated in rear views in FIG. 9. To this end two mat webs made as described hereinbefore are relatively turned through 180° and placed against each other with the bracing wires 2 on the outside, FIG. 10. Adjacent cobs belonging to different other mat webs are also disposed head to foot so that a good bond or interengagement between the two webs results, which can be enhanced by pasting, interlacing and quilting or the like with binding wire. This results in a fairly stiff board in strip form.

Another mode of manufacturing the board strip or boards resides in stretching two or more pairs of wires 2 in planes which are parallel to each other, as is shown in perspective in FIGS. 10 and 11. The corncobs are arranged head to foot between these wires and are bound with a thin wire 3. After every third layer or after any desired number of layers the binding wires are alternatingly passed through the thickness of the prepared board and wound around the bracing wires to hold the parallel layers together. After compressing the cobs in the direction of the bracing wires 2 and after tying in the latter the board strip is ready for use. Additional compressing will render the board strip even and close the butt joints between adjacent cobs (FIG. 11).

Two mats as shown in FIGS. 5 and 6 may also be combined to form a rigid board, FIG. 11. The procedure is the same as that described hereinbefore (see FIGS. 9 and 10).

Adjacent boards may be readily connected in the direction of the longitudinal axes of the cobs by means of a butt joint, FIGS. 13, 14, or a mitered joint, FIG. 16, cogging, FIG. 17, or rabbeting, FIGS. 19, 20, or a tongue and groove joint.

If the boards are made by connecting two mats, intermediate layers may be provided which serve for insulating or (and) for bonding and may be of organic or inorganic nature.

It is also possible to provide a single mat with a covering layer 5, FIG. 12, to stiffen the mat and give it a smooth surface on one side.

The mats and boards may also be made placing the undivided corncobs, which may be cut off only at the ends, of each layer, in bond in press molds and providing them with adhesives or binding layers of organic or inorganic nature, whereafter the layers are compressed by pressure acting in two or three directions of force, which are at right angles to each other; several layers may then be connected by pasting or other means.

It is obvious that the invention is not restricted to the embodiments shown and described. More particularly, the number of layers combined in a board may exceed two and the edges and joints thereof may be of different formation. The warp ends and the like may be of any desired material. Instead of corncobs, other coblike parts of plants or similar bodies of other material may be used. The bracing wires may extend through the corncobs by boring the cob feet approximately at the center of the cross-section and boring the heads of the cobs along chords of the circular cross-section, pulling the bracing wires automatically through these bores, and prestressing and tying the wires. In this case no binding wires are required. The mats or boards may also be reinforced with steel, structural steel mesh and the like.

What I claim is:

1. A composite structure composed of corn cobs, each having a wide head and a narrow foot with a tapering length therebetween, said structure comprising at least one layer of corn cobs lying with their longitudinal axes in a continuous line in a plurality of adjacent rows, the longitudinal axes of said rows being parallel to each other, and the totals of the widths of any two immediately adjacent rows of corn cobs measured in the transverse direction relative to the longitudinal axes thereof being approximately equal along the length of said any two adjacent rows, bracing wires extending at right angles to the longitudinal axes of said rows of corn cobs and transversely spaced relative to each other by approximately the length of one half a corn cob length, each said bracing wire extending in a linear path and in contact with each transversely adjacent corn cob in all of said rows, and tying wires securing said cobs to said bracing wires.

2. A composite structure composed of corn cobs, each having a wide head and a narrow foot with a tapering length therebetween, said structure comprising at least one layer of corn cobs lying with their longitudinal axes in continuous lines in a plurality of parallel and adjacent rows, all of said corn cobs in each row being arranged in head to head and foot to foot relationship, each cob in each row of cobs being staggered, lengthwise, relative to the cobs in the immediately adjacent row by the length of one half of one corn cob, bracing wires extending at right angles to the longitudinal axes of said rows of corn cobs and transversely spaced relative to each other by the length of approximately one half of a corn cob, said bracing wires extending in linear paths and in contact with each transversely adjacent corn cob in all of said rows, and tying wire securing each transversely adjacent corn cob in all of said rows to said bracing wire.

3. The composite structure of claim 1 wherein at least two such layers of corn cobs are provided, one superimposed on the other, said bracing wires lie on the outside of said layers, all adjacent corn cobs in each row and in each layer are arranged substantially in head to foot relationship.

4. A composite structure as claimed in claim 3, wherein a covering layer is provided for at least one row of corn cobs and all cobs of one layer are in approximately linear contact with said covering layer.

5. A structure as claimed in claim 3, wherein adjoining sides of cobs are complementarily shaped for mutual engagement.

6. A process of manufacturing composite structures of corn cobs, bracing material and tying wire, each of the corn cobs having a wide head and a narrow foot with a tapering length therebetween, said process comprising making at least one layer of corn cobs by placing lengths of bracing material in parallel spaced relation at a transverse distance from one another of less than the length of the shortest corn cob, placing a plurality of cobs on said lengths of bracing material with the longitudinal axes of the cobs lying in continuous lines in a plurality of parallel and adjacent rows lying at a right angle to the length of bracing material and with each transversely adjacent cob in contact with a same length of bracing material, binding each of the cobs to the lengths of bracing material with tying wire, and compressing the cobs in the direction of the length of the bracing material.

7. The process of manufacturing composite structures from corn cobs according to claim 6, which comprises making a number of single layer units individually and then superimposing the layers and interconnecting them by means of an adhesive.

8. The process of claim 6 wherein the cobs of each row are placed on the lengths of bracing material in head to head and foot to foot relationship, each cob in each row is staggered lengthwise relative to immediately adjacent cobs by the length of approximately one half of the length of one corn cob, and the lengths of bracing material between the ends of the rows of corn cobs are spaced approximately one half of the length of a corn cob and the lengths of bracing material at the ends of the rows of corn cobs are spaced about one third the length of a corn cob.

9. The process of claim 8 wherein an additional compressing step is used to eliminate any small irregularities in the material on the front side of the structure.

10. The process of claim 8 wherein the corn cobs are cut at different cross-sections to provide truncated bodies of equal lengths and wherein said truncated bodies are placed on the bracing material with all of the surfaces in contact therewith disposed in substantially the same plane to provide a structure having a different front and rear surface.

References Cited in the file of this patent

UNITED STATES PATENTS

| | | |
|---|---|---|
| 406,644 | Hanmore | July 9, 1889 |
| 453,354 | Hanmore | June 2, 1891 |
| 511,584 | Cabot | Dec. 26, 1893 |
| 1,491,725 | Needham et al. | Apr. 22, 1924 |
| 2,652,126 | Mazer | Sept. 15, 1953 |
| 2,672,177 | Werneskog | Mar. 16, 1954 |

FOREIGN PATENTS

| | | |
|---|---|---|
| 39,475 | Austria | Oct. 25, 1909 |
| 40,062 | Austria | Dec. 10, 1909 |
| 643,532 | France | May 16, 1928 |
| 1,015,423 | France | July 23, 1952 |